United States Patent [19]

Hine, Jr.

[11] 4,056,219
[45] Nov. 1, 1977

[54] BICYCLE HANDLEBAR PACK AND SUPPORT THEREFOR

[75] Inventor: Edward K. Hine, Jr., Louisville, Colo.

[73] Assignee: Hine-Snowbridge, Inc., Boulder, Colo.

[21] Appl. No.: 675,430

[22] Filed: Apr. 9, 1976

[51] Int. Cl.² .............................................. B62J 7/06
[52] U.S. Cl. ...................................... 224/36; 224/31; 224/41
[58] Field of Search ................ 224/30 R, 30 A, 32 R, 224/31, 36, 39 R, 41, 42.46 R, 42.45 R, 32 A, 42.03 R, 42.03 A, 43, 44; 280/289, 202

[56] References Cited

U.S. PATENT DOCUMENTS

| 444,089 | 1/1891 | Lamson | 224/41 |
| 597,318 | 1/1898 | Jenks | 224/39 R |
| 2,424,195 | 7/1947 | Schwinn | 224/36 |
| 3,853,253 | 12/1974 | Hawkins et al. | 224/39 R |
| 3,955,729 | 5/1976 | Montgomery | 224/36 |

FOREIGN PATENT DOCUMENTS

| 541,655 | 8/1959 | Netherlands | 224/30 A |
| 140,627 | 4/1920 | United Kingdom | 224/36 |

*Primary Examiner*—Robert J. Spar
*Assistant Examiner*—Jerold M. Forsberg
*Attorney, Agent, or Firm*—Thomas W. O'Rourke; Robert E. Harris

[57] ABSTRACT

A bicycle handlebar pack and support frame in which the support includes a means to cantilever the pack engaging portion of the support from the gooseneck-handlebar intersection of a bicycle, the pack engaging portion preferably comprising normally substantially horizontal forked members adapted to engage pocket portions on either side of the pack, normally vertical members depending from the support, releasable engaging means on the pack to secure the pack to the support, and a resilient member extending from the support at a position below the gooseneck-handlebar engaging portion, and preferably from the depending members, to the bicycle frame to bias the support into a stable relationship with the bicycle without interfering with convenient removal of the pack from the support.

8 Claims, 2 Drawing Figures

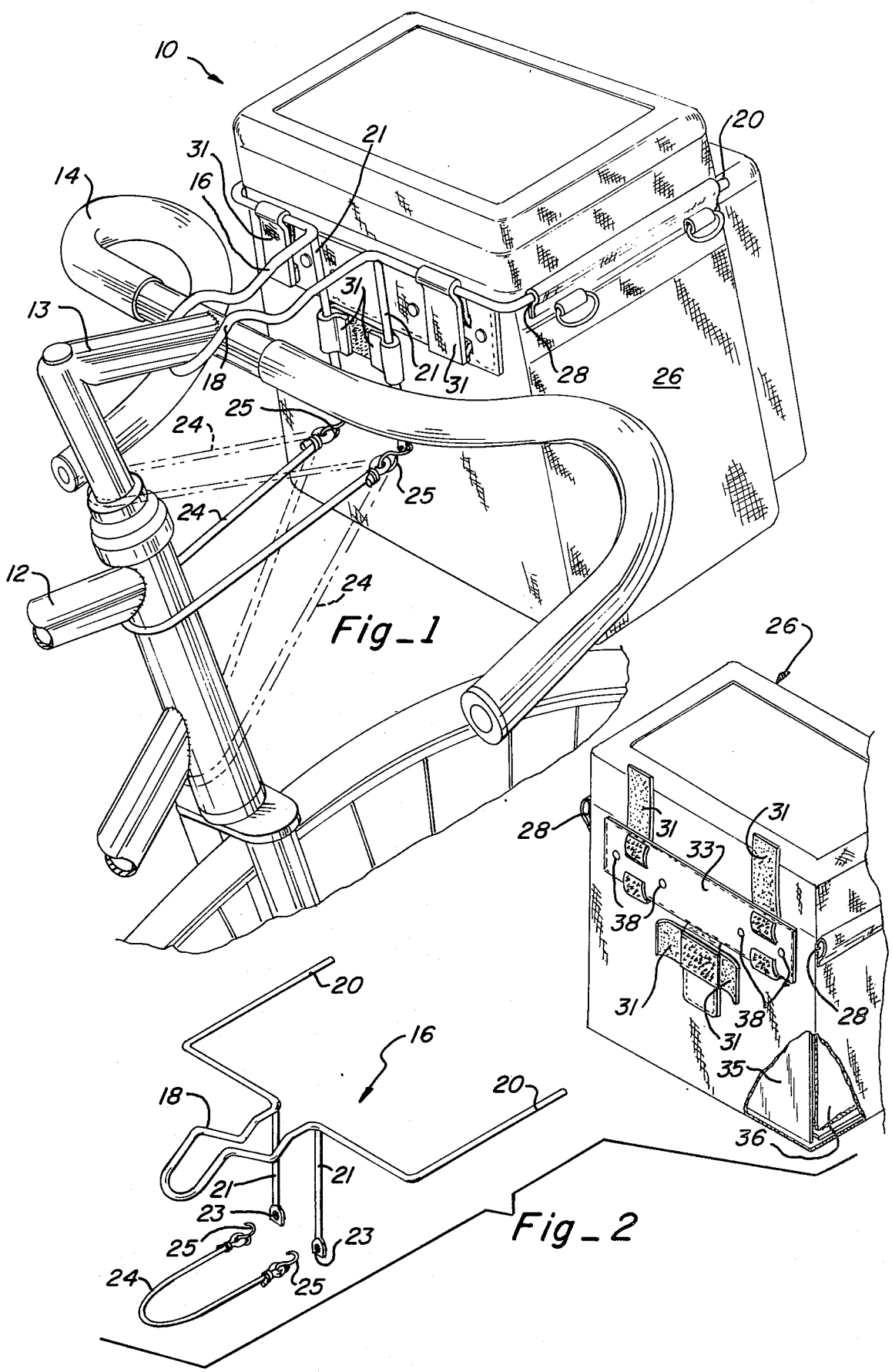

BICYCLE HANDLEBAR PACK AND SUPPORT THEREFOR

BACKGROUND OF THE INVENTION

1 Field of the Invention

The present invention relates generally to bicycle packs and supports therefor, and more particularly to a bicycle pack support combination in which a simple, economical support is conveniently and securely attached to the bicycle frame by means of a resilient member, and the pack is conveniently releasable from the support for removal.

2. Description of the Prior Art.

Handlebar packs and supports therefor have been known for some time. Originally, supports of the type of concern were in the form of a heavy wire or rod means to fit under the bicycle gooseneck portion and over the handlebars to cantilever a framework from the bicycle handlebar. These provided a simple, lightweight framework which was easily counted to and removed from a bicycle. Further, the support enabled the pack to be releasably attached to the framework at the upper back portion of the pack and, in one embodiment, further support to fit under the pack. However, though the simplicity of the cantilevered support gained wide acceptance, a problem developed with the stability of such supports. When unsprung bicycles encountered choppy riding, the cantilevered support and back would vigorously bounce and oscillate since the support was not secured against upward movement of the pack.

A second generation concept involved a similar support cantilevered from the bicycle handlebar-gooseneck interface and a simple forked arrangement which fit into pockets on the side of the handlebar pack and, for instance, Velcro fasteners engaging the frame at the backside of the back. In addition to this basic support and pack relationship, which would be subject to the bump induced oscillations of the above-discussed embodiment, resilient members extending from the bottom side of the pack, and more specifically from D-rings attached to the bottom of the pack, were provided to distend and engage the bicycle at, for instance, the fork front wheel region. These resilient members satisfactorily stabilized the pack against undersirable oscillations, but also attached the pack per se to the bicycle in a manner most inconvenient to release. Even after first releasing the pack from the forked arrangement, and thereafter releasing the resilient members from the bicycle frame, the pack still was encumbered with bottom hardware in the form of D-rings with resilient members dangling therefrom. However, in view of the serious objections to the oscillations in the pack, the second generation, resilient member embodiment is generally recognized as a significant improvement even with the drawback of inconvenience in disconnecting and attaching the pack, and the superfluous, for purposes of the pack per se, hardware attached to the pack.

SUMMARY OF THE INVENTION

The present invention, which provides a heretofore unavailable improvement over previous bicycle handlebar packs, comprises a simple, lightweight handlebar support which is independently and stably mounted to the bicycle and, concurrently, providing simple attachment and detachment of the pack from the secure support while leaving the pack unencumbered with superfluous, for purposes of the pack, hardware.

Accordingly, an object of the present invention is to provide a new and improved bicycle handlebar pack and support configuration which is of a simple, lightweight, economical and convenient design.

Another object of the present invention is to provide a new and improved bicycle handlebar support which is stable with regard to bumps and oscillations when mounted to the bicycle.

Yet another object of the present invention is to provide a new and improved bicycle handlebar pack and support therefor in which the pack may be easily detached and removed from the support.

Still another object of the present invention is to provide a new and improved bicycle handlebar pack which is free of cumbersome hardware which does not contribute directly to the functions of the pack.

These and other objects and features of the invention will become apparent from the following description.

BRIEF DESCRIPTION OF THE DRAWINGS

In the Drawing

FIG. 1 is a perspective view of a bicycle pack and support therefor secured to a bicycle; and FIG. 2 is an exploded, partially cutaway, perspective view of the bicycle pack and support of FIG. 1.

DETAILED DESCRIPTION OF THE INVENTION

Turning now to the drawing, wherein like components are designated by like reference numerals throughout the various figures, a handlebar pack and support combination is accord with the instant invention is illustrated in FIGS. 1 and 2 and generally designated by the reference numeral 10 in FIG. 1. As will be described in more detail hereinafter, handlebar pack and support combination 10 is attached to bicycle 12, as shown in FIG. 1, and particularly at the intersection of gooseneck 13 and handlebar 14. More specifically, support 16 is attached to the intersection of gooseneck 13 and handlebars 14 by handlebar engaging means 18, a conventional arrangement which passes under gooseneck 13 and over handlebars 14 to cantilever support 16 therefrom. It should be noted that conventional engaging means 18 does not preclude, as illustrated, counter clockwise movement of support 16.

Support 16 also includes forked members 20 which extend, nominally, in horizontal, spaced relationship. Depending members 21 extend in a, nominally, vertical relationship and have defined in the termini thereof eyes 23. Resilent member 24 extends in a tension mode from support 16 to bicycle 12, and, in a preferred embodiment as illustrated in FIG. 1, is attached to eyes 23 of depending members 22 by means of hooks 25 secured to resilient member 24. Resilient member 24 may be an elastic cord, a metal spring with, preferably, a protective cover or any other such stretchable member. The actual attachment of resilient member 24 to bicycle 12 is not critical and may also be at the positions shown in ghosted fashion, or elsewhere on bicycle 12. The purpose of resilient member 24 is to bias cantilevered support 16 in a secure relationship to avoid possible bouncing of handlebar engaging means 18 away from gooseneck 13.

Pack 26 may be secured to support 16 in a number of manners, but, primarily, in a manner which is readily releasable. In a preferred embodiment, forked members 20 fit into pockets 28 defined in pack 26 to provide a primary support. However, to further insure a stable and secure attachment between support 16 and pack 26, releasable securing means 31, which may conveniently be, as illustrated, Velcro material or, alternatively, utility snaps or other securing means, are positioned on backing members 33 to engage support 16 and prevent forked members 20 from sliding from pockets 28 as well as to secure pack 26 against general movement relative to support 16.

As shown in the cutaway portion of FIG. 2, pack 26 has integral therewith back stiffener 35 and bottom stiffener 36, which are preferably of a light, rigid material such as aluminum sheet. Stiffeners 35 and 36 are preferably joined to pack 26 by insertion in internal pockets defined in pack 26. As a result, the back and bottom surfaces of pack 26 are of a predetermined, inflexible configuration. Accordingly, since, as shown in FIG. 1, pack 26 is tilted somewhat with the top thereof towards the rider (this tilt being within the definition for purposes of the disclosure of "normally horizontal"), depending members will bear upon back stiffener 35 and hold pack 26 in a stable relationship. The stable relationship of pack 26 relative to support 16 is further enhanced by rivets 38 which attach backing members 33 to back stiffener 35.

Thus, as illustrated in FIGS. 1 and 2 and described above, support 16 is securely and stably engaged on gooseneck 13, handlebars 14 and, ultimately, to bicycle 12, by the conserted forces generated at handlebar engaging means 18 and resilient member 24. Given the secure mounting of support 16 onto bicycle 12, it is then only necessary to attach pack 26 to support 16 in a stable manner to provide the desired result. No resort is made to resilient members attached to or extending from pack 26. Pack 26 is not involved in lending stability to support 16.

Although only one embodiment of the present invention has been illustrated and described, it is anticipated that various changes and modifications will be apparent to those skilled in the art, and that such changes may be made without departing from the scope of the invention as defined by the following claims.

What is claimed is:

1. A handlebar pack and support therefor comprising:
   a support housing:
      means for engaging the joinder of a bicycle gooseneck and handlebar and projecting in a first direction in a cantilevered manner;
      forked members projecting substantially in the first direction from the engaging means in a parallel, spaced apart relationship; and
      at least one depending member extending from the support in a second direction substantially perpendicular to the plane of the forked members at a position between the forked members and the engaging means;
   a pack comprising:
      a substantially rectilinear enclosure having a top portion, a bottom portion, two side portions, a front portion, and a back portion;
      parallel pockets defined one each in each side portion of the enclosure and adapted to receive the forked members of the support; and
      securing means disposed upon the back portion of the enclosure to releasably engage the portion of the support including a depending member adjacent the back portion of the enclosure; and
   a resilient member attached to the support and adapted to engage an adjacent portion of a bicycle when the support and pack are attached to a bicycle;
   whereby, the engaging means and the resilient member are adapted to stably and securely attach the support to a bicycle in a prestressed manner, the forked members and depending member are adapted to engage the pack with the securing means holding the pack to the support in a substantially inflexible manner.

2. A handlebar pack and support therefor as set forth in claim 1 in which the engaging means comprise a U-shaped member in which the legs of the U adjacent the U-bend initially extend in a common plane for finite distance, each leg at the end of the finite distance then curves away from the commom plane, and further yet spaced from the bottom of the U, recurves to an orientation substantially parallel to the common plane.

3. A handlebar pack and support therefor as set forth in claim 1 in which the resilient member is an elastic cord.

4. A handlebar pack and support therefor as set forth in claim 3 in which hook members are attached to each end of the elastic cord and the hook members are engaged in openings defined in the terminus of the depending members.

5. A handlebar pack and support therefor as set forth in claim 1 in which the pack enclosure is formed of a pliant material and includes a stiffener member formed in the back portion of the enclosure.

6. A handlebar pack and support therefor as set forth in claim 5 in which the securing means comprise releasable fasteners at least partially attached to the stiffener member in the back portion of the enclosure.

7. A handlebar pack and support therefor as set forth in claim 5 in which a bottom stiffener member is positioned in the bottom portion of the enclosure.

8. A handlebar pack and support therefor comprising:
   a support having:
      U-shaped means for engaging the joinder of a gooseneck and handlebar, the means being elongated and projecting in a first direction in a cantilevered manner;
      forked members projecting substantially in the first direction from the engaging means in a parallel, spaced apart, relationship symmetrically to but spaced more widely than the legs of the U-shaped member; and
      depending members attached to the support and extending in a second direction substantially perpendicular to the plane of the forked members at a position between the forked members and the engaging means;
   a pack comprising:
      a substantially rectilinear enclosure having a top portion, a bottom portion, two side portions, a front portion and a back portion having a stiffener member formed therein, the top portion being moveably secured to the enclosure at least partially attached by a releasable fastener;
      parallel, elongated pockets defined one each in each side of the enclosure and adapted to receive the forked members of the support; and
      securing means positioned at the back portion of the enclosure and at least partially attached to the back portion stiffening member, the securing means being adapted to releasably engage the portion of the support adjacent the back portion of the enclosure including the depending members; and a resilient member attached to the support and adapted to engage an adjacent portion of a bicycle when the support is cantilevered from the joinder of the gooseneck and handlebar.

* * * * *